(12) United States Patent
Zhou et al.

(10) Patent No.: US 11,409,795 B2
(45) Date of Patent: Aug. 9, 2022

(54) ATOMICALLY EXECUTED APPLICATION PROGRAM INTERFACES

(71) Applicant: International Business Machines Corporation, Armonk, NY (US)

(72) Inventors: Bei Chun Zhou, Beijing (CN); Adrian Kyte, Hursley (GB); Joe Winchester, Hursley (GB); Jenny J. He, Hursley (GB); Guan Jun Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1008 days.

(21) Appl. No.: 16/123,228

(22) Filed: Sep. 6, 2018

(65) Prior Publication Data

US 2020/0082025 A1 Mar. 12, 2020

(51) Int. Cl.
*G06F 16/901* (2019.01)
*G06F 16/11* (2019.01)
(52) U.S. Cl.
CPC ............ *G06F 16/901* (2019.01); *G06F 16/11* (2019.01)
(58) Field of Classification Search
None
See application file for complete search history.

(56) References Cited

U.S. PATENT DOCUMENTS

| 9,632,818 B2 | 4/2017 | Huang et al. |
| 2017/0243193 A1 | 8/2017 | Manian et al. |
| 2017/0293503 A1 | 10/2017 | Curtis |
| 2017/0330174 A1 | 11/2017 | DeMarinis et al. |
| 2018/0054491 A1 | 2/2018 | Mankovskii et al. |
| 2018/0108089 A1 | 4/2018 | Jayachandran |
| 2018/0197155 A1 | 7/2018 | Georgen et al. |
| 2019/0114182 A1* | 4/2019 | Chalakudi ........... H04L 63/0435 |
| 2020/0026785 A1* | 1/2020 | Patangia ............... H04L 63/123 |

FOREIGN PATENT DOCUMENTS

AU 2017101413 11/2017

OTHER PUBLICATIONS

Weber, Ingo, et al., "Untrusted Business Process Monitoring and Execution Using Blockchain", Springer International Publishing, BPM 2016, LNCS 9850, pp. 329-347. (Year: 2016).*
Pourmajidi, William & Andriy Miranskyy, "Logchain: Blockchain-assisted Log Storage", 2018 IEEE 11th International Conference on Cloud Computing, pp. 978-982. (Year: 2018).*
Luis Felipe Cabrera, et al., "Web Services Business Activity Framework" WS Business Activity.
Wikipedia, "WS-Atomic Transaction".

* cited by examiner

*Primary Examiner* — Scott A. Waldron

(57) ABSTRACT

An example operation may include one or more of identifying a caller blockchain node and one or more callee blockchain nodes within a blockchain network and issuing, by the caller blockchain node, application programming interface calls to application programming interfaces corresponding to each of the one or more callee nodes, in response to a first application programming interface call being issued successfully, directing a smart contract associated with the caller blockchain node to initiate a distributed transaction involving the one or more callee nodes to perform the application program interface calls, the caller node issues application programming interface calls and the one or more callee nodes each performing application programming interface requests.

20 Claims, 14 Drawing Sheets

US 11,409,795 B2

ATOMICALLY EXECUTED APPLICATION PROGRAM INTERFACES

TECHNICAL FIELD

This application generally relates to a database storage system, and more particularly, to atomically executed application program interfaces.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by requiring common systems, implementation, programming languages, or file systems. As such, what is needed is a solution using atomically executed application program interfaces to overcome these significant drawbacks.

SUMMARY

One example embodiment provides a system that includes a processor and memory, wherein the processor is configured to perform one or more of a blockchain network, which includes a caller node and one or more callee nodes. The one or more callee nodes each include a first smart contract, configured to perform application program interface requests. The caller node includes a second smart contract and application program interfaces for each of the one or more callee nodes. The caller node is configured to issue application program interface calls to the application program interfaces. In response to a first application program interface call issued successfully, the caller node is configured to direct the second smart contract to initiate a distributed transaction that involves the one or more callee nodes to perform the application program interface calls.

Another example embodiment provides a method that includes one or more of identifying a caller blockchain node and one or more callee blockchain nodes within a blockchain network and issuing, by the caller blockchain node, application programming interface calls to application programming interfaces corresponding to each of the one or more callee nodes, in response to a first application programming interface call being issued successfully, directing a smart contract associated with the caller blockchain node to initiate a distributed transaction involving the one or more callee nodes to perform the application program interface calls, the caller node issues application programming interface calls and the one or more callee nodes each performing application programming interface requests. the one or more callee nodes each performing application programming interface requests.

A further example embodiment provides a non-transitory computer readable medium comprising instructions, that when read by a processor, cause the processor to perform one or more of identifying a caller blockchain node and one or more callee blockchain nodes within a blockchain network, the caller node issuing application programming interface calls and the one or more callee nodes each performing application programming interface requests, issuing, by the caller blockchain node, application programming interface calls to application programming interfaces corresponding to each of the one or more callee nodes, in response to a first application programming interface call being issued successfully, directing a smart contract associated with the caller blockchain node to initiate a distributed transaction involving the one or more callee nodes to perform the application program interface calls.

DETAILED DESCRIPTION

Figure 1:
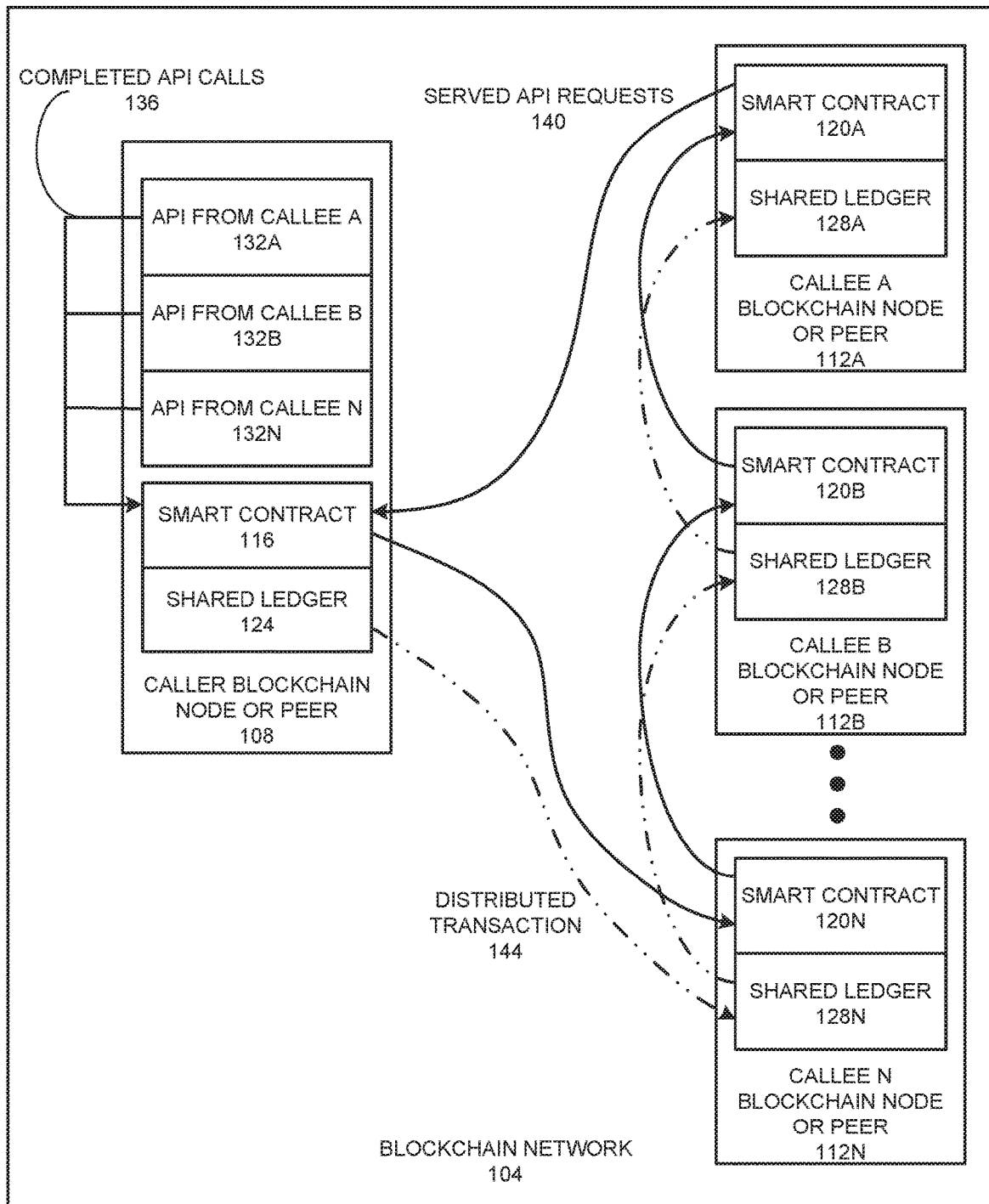
FIG. 1 illustrates a network diagram of API processing components in a blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide process for atomically issued and processed API calls in a public or permissioned blockchain network.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts trans-action-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and crypto-graphically linked together. Accordingly, it is not possible to tamper with the ledger data without breaking the hash links.

A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include providing a technical solution, where a gap previously existed, by incorporating an API service status into shared ledger on blockchain platforms to enable a distributed transaction to act atomically. An application may include a number of different and disparate API calls, which are individually routed to certain blockchain nodes to perform a requested API function and notify a requesting node initiating the API calls whether the API call completed successfully, or not. A distributed transaction to the blockchain only occurs if each of the required API calls completes successfully.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the API servicing is implemented due to smart contracts, distributed ledgers, separate and decentralized caller and callee blockchain nodes, commit or cancel consensus options, accessibility, and block immutability, which are inherent and unique to blockchain. In particular, a smart way of deciding the API services in a distributed transaction should all commit or cancel without binding together each other's internal implementation is demonstrated within blockchain smart contracts. Only participants from a distributed transaction can join and share status via a blockchain shared ledger. Only the completion status is shared among nodes which provides the security for the blockchain network. Multiple callees and a caller can establish a blockchain network which operates in a decentralized and distributed fashion. Distributed transaction results (COMMIT or CANCEL) for all the nodes in a blockchain network demonstrates consensus. The ability of blockchain network participants (i.e. callers and callees) to query a peer's transaction results demonstrates accessibility. Finally, the transaction results are prevented from being changed or modified, which demonstrates immutable/accountability benefits to blockchain systems.

One of the benefits of the example embodiments is that it improves the functionality of a computing system by enhancing distributed transaction execution. Through the blockchain system described herein, a computing system can perform distributed transaction execution functionality by storing participants' completion status in shared ledgers based on blockchain networks, thus allowing participants to query each other's completion status and decide whether to commit or rollback a transaction.

The example embodiments provide numerous benefits over a traditional database. For example, through the blockchain the embodiments provide incorporating API service status into shared ledgers on blockchain platforms to enable a distributed transaction to act atomically. Meanwhile, a traditional database could not be used to implement the example embodiments because the participants may have very different systems, implementation, programming languages, or file systems. Meanwhile, if a traditional database were used to implement the example embodiments, the example embodiments would suffer from unnecessary drawbacks such as slower application development time and integration. Accordingly, the example embodiments provide for a specific solution to a problem in the arts/field of distributed API support in a decentralized environment.

The example embodiments also change how data may be stored within a block structure of the blockchain. For example, a success or failure result for each API call in an application may be independently stored in a data section of blocks of a blockchain. By storing the success or failure results for each API call within data blocks of a blockchain, the success or failure results may be appended to an immutable ledger through a hash-linked chain of blocks. API calls may fail for many reasons, including a URL of an API call is wrong, or there is no authority to call this API, or there is invalid input data for the API.

FIG. 1 illustrates a network diagram of API processing components in a blockchain, according to example embodiments. Referring to FIG. 1, the network 100 includes a blockchain network 104, which may be either a public blockchain network 104 or a permissioned blockchain network 104.

In the world of API economies, application owners package applications as services and expose the services as Application Program Interfaces (APIs) for others to use. An API economy (application programming interface economy) is a general term that describes the way application programming interfaces (APIs) can positively affect an organization's profitability. An API is a customer interface for technology products that allows software components to communicate. For example, a company published an API for a geography service. Any external part who invokes the company API must pay some money to the company according to a service contract. In this case, the company receives a financial benefit from its API service.

The application can be either transitional monolithic applications or new Microservice-type atomic applications. APIs as intercommunication methods has possess notable advantages to decouple applications from software/hardware platforms and the implementation language. For example, a company may use a REST API in its own Python application to access a service provided by another company, where the service is implemented using Java. An API is a stateless calling method which means the API itself may not be relied upon to maintain distributed transactions by passing transaction context like tRPC (transactional remote process call). Lacking of a way to distribute transaction logs is another issue to limit API peers from recovery under system failures.

For example, a new travel company is designing a new client-facing mobile application where the application uses APIs provided by airlines, hotel companies, insurance companies, and banks. It is desirable to make all the services involved in such a travel request behave atomically. For example, if a customer wants to plan a trip, he/she may use a travel booking mobile application to input travel requirements, select flights and hotels, rent a car, select a bank for payment, and submit the request. Then, at the back end the server application would create sub-requests in the form of APIs and send the requests to API providers. Some API calls may succeed, however, and other API requests may fail. If API services behave differently from each other, from an API caller (for example, a travel application) perspective, data consistency is lost. The present application aims to solve this problem by utilizing a distributed transaction management mechanism among API services, which provides compensation logic for cancellation. There is no specific sequence in invoking the APIs. In order to shorten the response time, API calls often are issued at the same time and without knowing the completion status of each other.

A problem may arise in conventional systems if compensation may not always work. For example, assume a hotel reservation was booked and credit was earned upon booking. If a user were to spend the credit for other things, and decide to cancel the hotel reservation, cancellation may not be allowed because credit cannot be cancelled. Additionally, an application developer may still need to design compensation logic, which may be additional effort and be error prone.

The present application utilizes a solution at a system level instead of an application level. This enables a request for API services to behave as a distributed transaction similar to transaction processing middleware. Transactional context is passed between a coordinator and participants and transaction state is stored using blockchain technology that supports reliable shared ledgers to store and share transaction state for each application and API request. Blockchain provides useful technology to share information among nodes or peers. The information is committed to each node or peer's shared ledger, which is reliable. All the nodes or peers are equal with each other which is also true in an API economy world. Usually blockchain is used to support a new type of distributed application in a format of blockchain chaincode (i.e. smart contracts). The present application hides blockchain technology behind applications as a distributed middleware to manage distributed transactions.

The blockchain network 104 includes a caller node 108 and one or more callee nodes 112, shown as callee nodes 112A, 112B, and 112N. An application may have any number of APIs, and thus any number of callee nodes 112. The blockchain network 104 runs an application that includes one or more application programming interfaces (API). Each API is distinct from other APIs and is associated with a specific callee node 112. The application determines which blockchain node will be a caller node 108, and which blockchain nodes will be callee nodes 112. Additionally, APIs 132 for each callee node 112 are stored on the caller node 108. Caller node 108 thus includes APIs for each caller node 112, identified as a callee A API 132A, a callee B API 132B, and a callee N API 132N. Caller node 108, being a blockchain node or peer, also includes a smart contract 116, which may include the application including APIs 132A, 132B, and 132N, and a shared or distributed ledger 124.

Each of the callee nodes 112, being blockchain nodes or peers, also includes a smart contract 120 and a shared ledger 128. Thus, callee node 112A includes smart contract 120A and shared ledger 128A, callee node 112B includes smart contract 120B and shared ledger 128B, and callee node 112N includes smart contract 120N and shared ledger 128N. In some embodiments one or more callee nodes or peers 112 (providers) may have two or more APIs as a group.

When an application request is received by the caller node or peer 108, the caller node or peer 108 issues a first API request 140, which causes the caller node or peer 108 to direct the second smart contract 116 to initiate a distributed transaction 144 that involves one or more callee nodes or peers 112. The caller node smart contract 116 issues subsequent API requests 140 to each of the callee nodes or peers 112. Each of the callee nodes or peers 112 communicates a success or failure status for each of the API calls back to the caller node or peer 108. Each of the callee nodes or peers 112 also updates a storage block in the shared ledgers 124, 128 with its completion status.

Figure 2A:
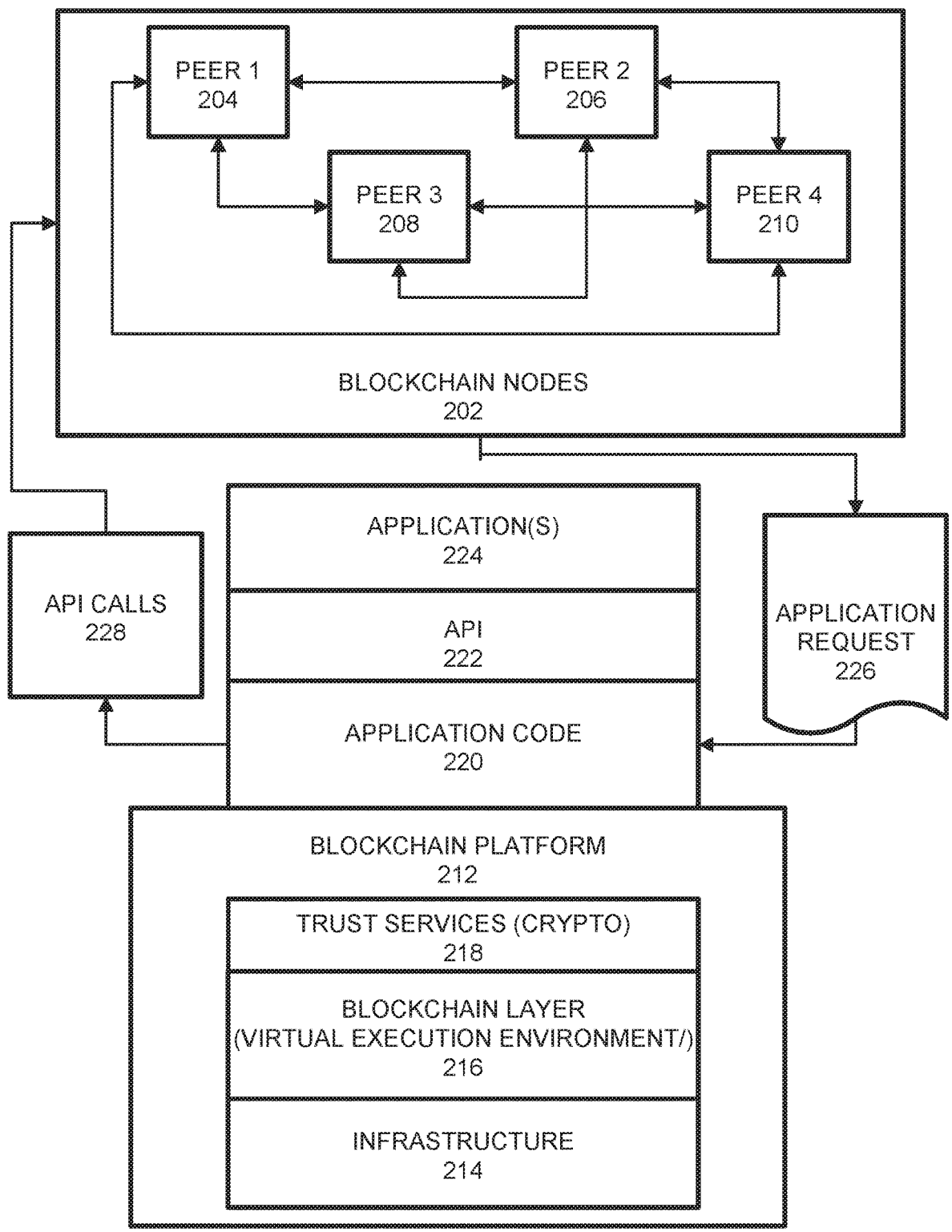
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 may include an application request, and may be processed by one or more processing entities (e.g., virtual machines) included in the blockchain layer 216. The result 228 may include various API calls issued to blockchain nodes or peers that act as callees to perform each of the issued API calls. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, an application request 226 may be received by a caller node or peer. One function may be to issue a group of API calls 228 to other blockchain nodes or peers to execute, which may be provided to one or more of the nodes 204-210.

Figure 2B:
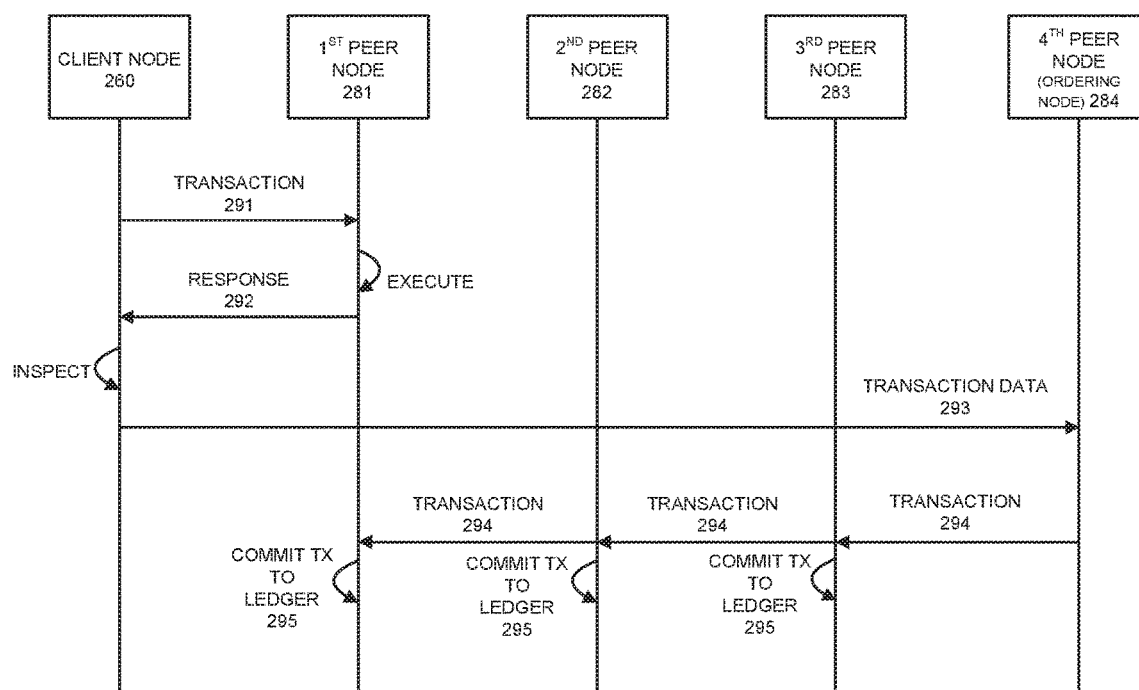
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation. Instead, the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
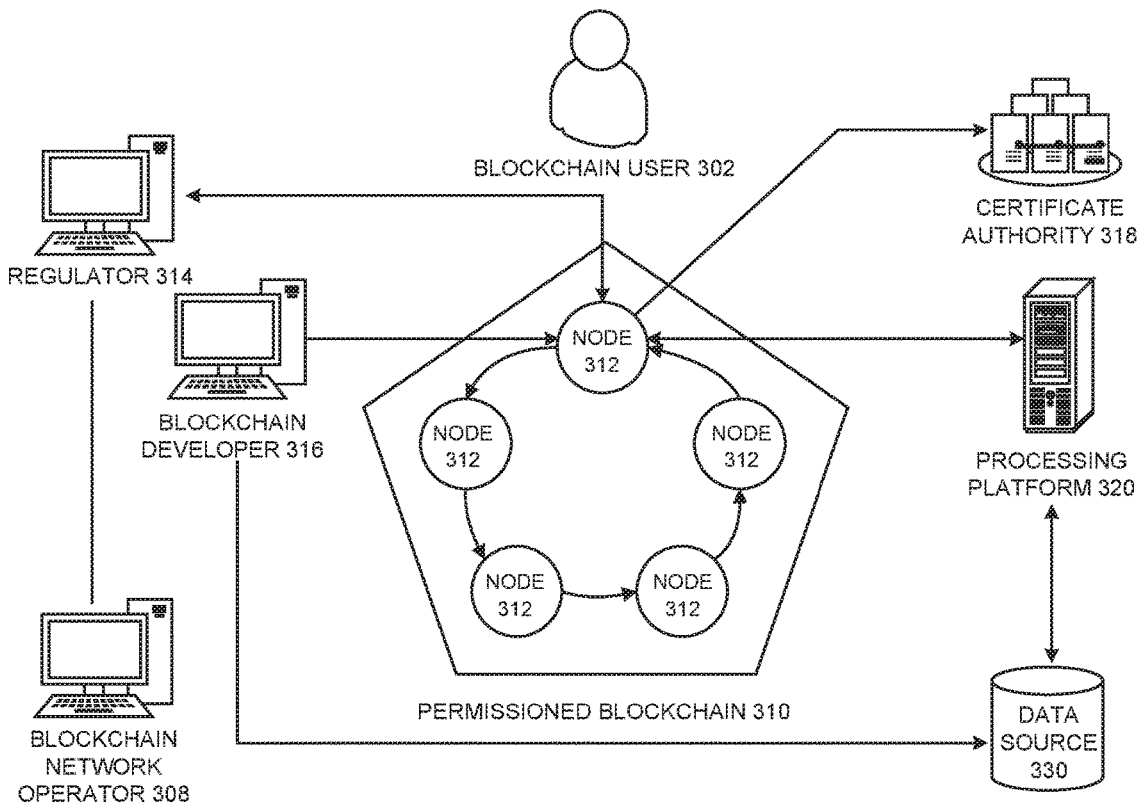
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
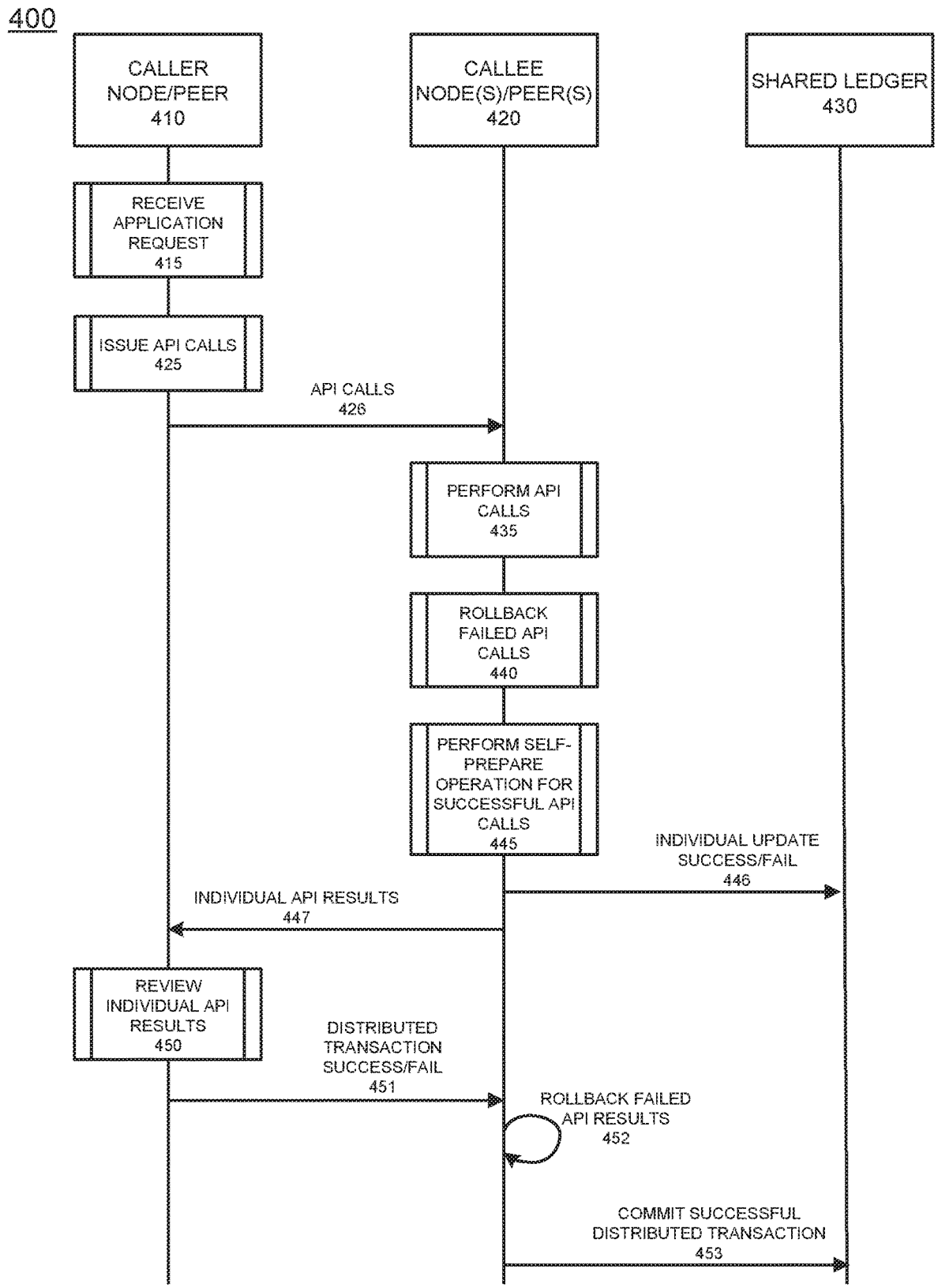
FIG. 4 illustrates a system messaging diagram for atomically performing API calls of an application within a blockchain network, according to example embodiments.

FIG. 4 illustrates a system messaging diagram for atomically performing API calls of an application within a blockchain network, according to example embodiments. Referring to FIG. 4, the system diagram 400 includes a caller node or peer 410, one or more callee nodes or peers 420, and a shared ledger 430. An application within the blockchain network 104 utilizes the caller node or peer 410 and the callee nodes or peers 420 to issue, execute, and resolve API calls for the application. Prior to receiving application requests 415, the caller 410 and callee nodes 420 are defined for the application. The caller node or peer 410 issues API calls and the callee nodes or peers 420 serve the API requests.

The caller node or peer 410 receives an application request 415, where the application includes one or more API calls. After receiving the application request 415, the caller node or peer 410 issues API calls 425 corresponding to the application. The API calls 426 are issued to specific callee nodes or peers 420 configured to process those API calls 426.

The callee nodes or peers 420 then attempt to perform the individual API calls 435, after receiving the API calls 426. Some API calls 426 may be failed, in which case the corresponding callee node or peer 420 rolls back the failed calls 440. Some API calls 426 may be successfully performed 435 by callee nodes or peers 420, in which cases the corresponding callee node or peer 420 performs a self-prepare operation 445. 'Self-prepare' means a callee node or peer 112 should check if its API logic has executed successfully with data ready to write to persistent storage.

Blockchain transactions are created by each callee node or peer 420, reflecting whether an individual update succeeded or failed 446. This, in turn, produces updates to the shared ledgers 430 of the blockchain network 104 to store the individual success or failure results 446. Each of the callee nodes or peers 420 also provides individual API results messages 447 back to the caller node or peer 410, reflecting the success or failure status.

The caller node or peer 410 receives the individual API results 447 and reviews the results 450. In response, the caller node or peer 410 provides a notification 451 to all callee nodes or peers 420 indicating whether the distributed transaction 144 succeeds or fails. If the distributed transaction 144 fails, the callee nodes or peers 420 rolls back the failed API results 452, and if the distributed transaction 144 succeeds, the callee nodes or peers 420 commit the result 453 to persistent storage. Each further received application request 415 is thus handled in the same fashion.

Figure 5A:
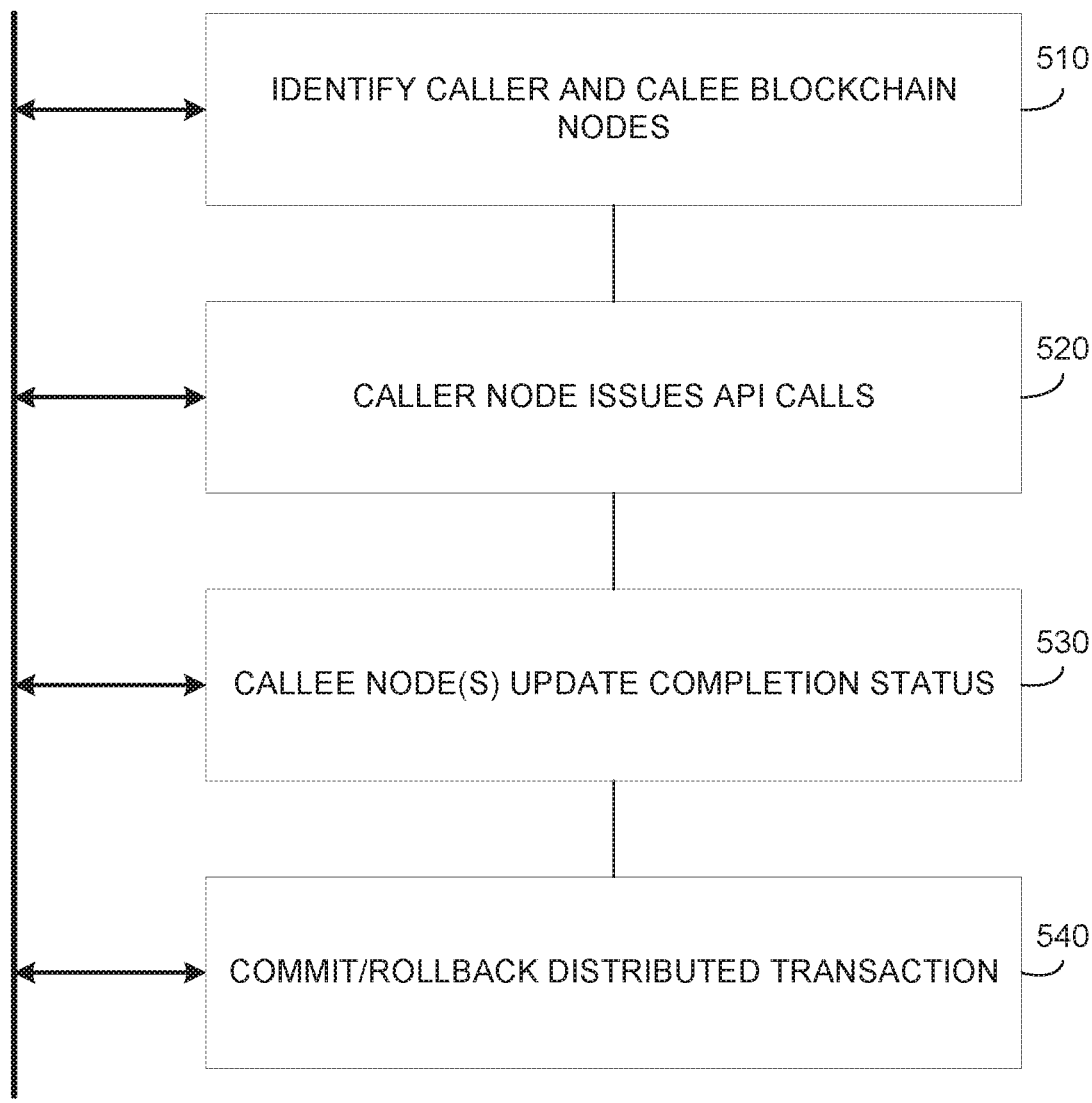
FIG. 5A illustrates a flow diagram of an example method of atomically resolving API calls in a blockchain, according to example embodiments.

FIG. 5A illustrates a flow diagram 500 of an example method of atomically resolving API calls in a blockchain, according to example embodiments. Referring to FIG. 5A, the method 500 may include one or more of the following steps.

At block 510, caller 108 and callee 112 blockchain nodes are identified. The blockchain network 104 includes caller 108 and callee 112 nodes to execute API calls and results of an application. Thus, in contrast to previous approaches, the API calls and results are completely resolved within a blockchain network 104.

At block 520, the caller node 108 issues API calls to one or more callee nodes 112, which may resolve the API calls concurrently. Blockchain chaincode hides behind the API as a special EXIT which would spawn a new thread to run concurrently with the application as a distributed middleware. A 'special EXIT' is a program to which the application can transfer the control to and can then resume control when the EXIT program has finished. The EXIT will never interfere with the logic of the program but can extend the function of a system to meet specific requirements, in this case to interface between the application and blockchain platforms. The new thread runs as an interface between the application and the blockchain platform. It is used to update transaction information in shared ledgers 124,128 and query the information if necessary.

The unique point of blockchain is that it is independent from platform and implementation language. Blockchain chaincode is used to update transaction information in the shared ledgers 124, 128, and query the information if necessary. When a request is received, the application begins to run. When it calls a first API, a blockchain message is broadcast to all the nodes or peers about the API invocation, and then triggers chaincode to update the information into the shared ledgers 124, 128. Then all the nodes or peers learn that a distributed transaction 144 has began, and a first participant (API callee) is enlisted in the distributed transaction 144.

At block 530, each of the one or more callee nodes 112 updates their respective completion status. Once the first API call completes normally, the callee 112 would first perform a self-prepare (e.g. TCC TRY phase). TCC stands for "TRY, COMMIT/CANCEL", which means a caller node or peer 108 calls a callee's 112 service, and after callee 112 completes the work, the callee node or peer 112 needs to get prepared (make sure callee node or peer 112 can commit or cancel the transaction, regardless of what decision is made by performing data persistence before image, after image, or both. 'Data persistence' means that the data is written to non-volatile storage and survives after the process with which it was created has ended.

If the callee 112 gets prepared, the callee 112 would then broadcast the success result so that all the nodes or peers can learn the result immediately. If the API call encountered a failure, the callee node or peer 112 would rollback all the updates, and broadcast a failure to all the nodes or peers. For example, if callee 112A completed its work but any other participating callee 112 has broadcast a failure message to the blockchain network 104 via the shared ledger 128, callee 112A had to rollback its update from the after image to a before image (the after image means the data status after the API call, and the before image means the data status before the API call). For example, when callee node or peer A 112A completes successfully but callee node or peer B 112B fails, callee node or peer B 112B will broadcast a failure message through the shared ledger 124, 128. Callee node or peer A 112A will need to rollback its update because callee node or peer B 112B failed. When the rollback happens, the API call for callee node or peer A 112A has already finished. The rollback is not part of the API call; it is done by the callee node or peer 112. By separating the API call from the rollback, a loose coupling is maintained between the caller node or peer 108 and callee nodes or peers 112 in order for the distributed transaction to behave atomically.

Similarly, the invocation of a later or concurrent API invocation and API outcome are broadcast and persisted into the shared ledger 124, 128. If an API call fails or cannot response in a predefined time threshold, then the default behavior for the distributed transaction 144 should be an ABORT, which means all the nodes or peers 112 could take action to abort the update. Each API outcome (whether success or failure) will be individually recorded in the shared ledger 124, 128 and then broadcast on the blockchain network 104. The distributed transaction 144 can only be committed after ALL of the API outcomes are successful. Any one failure will result in the cancellation of the distributed transaction 144.

At block 540, the callee nodes 112 commit (based on success) or rollback (based on failure) the distributed transaction 144. Once all APIs complete successfully and the caller node or peer 108 ends the application normally, the blockchain network 104 would capture this event and broadcast the normal termination of the application to all peers or nodes so that all the peers or nodes could commit the distributed transaction 144 to the shared ledger 124, 128. Using the blockchain or similar techniques of shared ledgers to manage distribute transactions 144 provides a 'distributed' and 'loose decoupling' way to support API peers to behave as a whole, so application developers may focus on business logic and leave transaction management to distributed transaction processing 'middleware'.

Figure 5B:
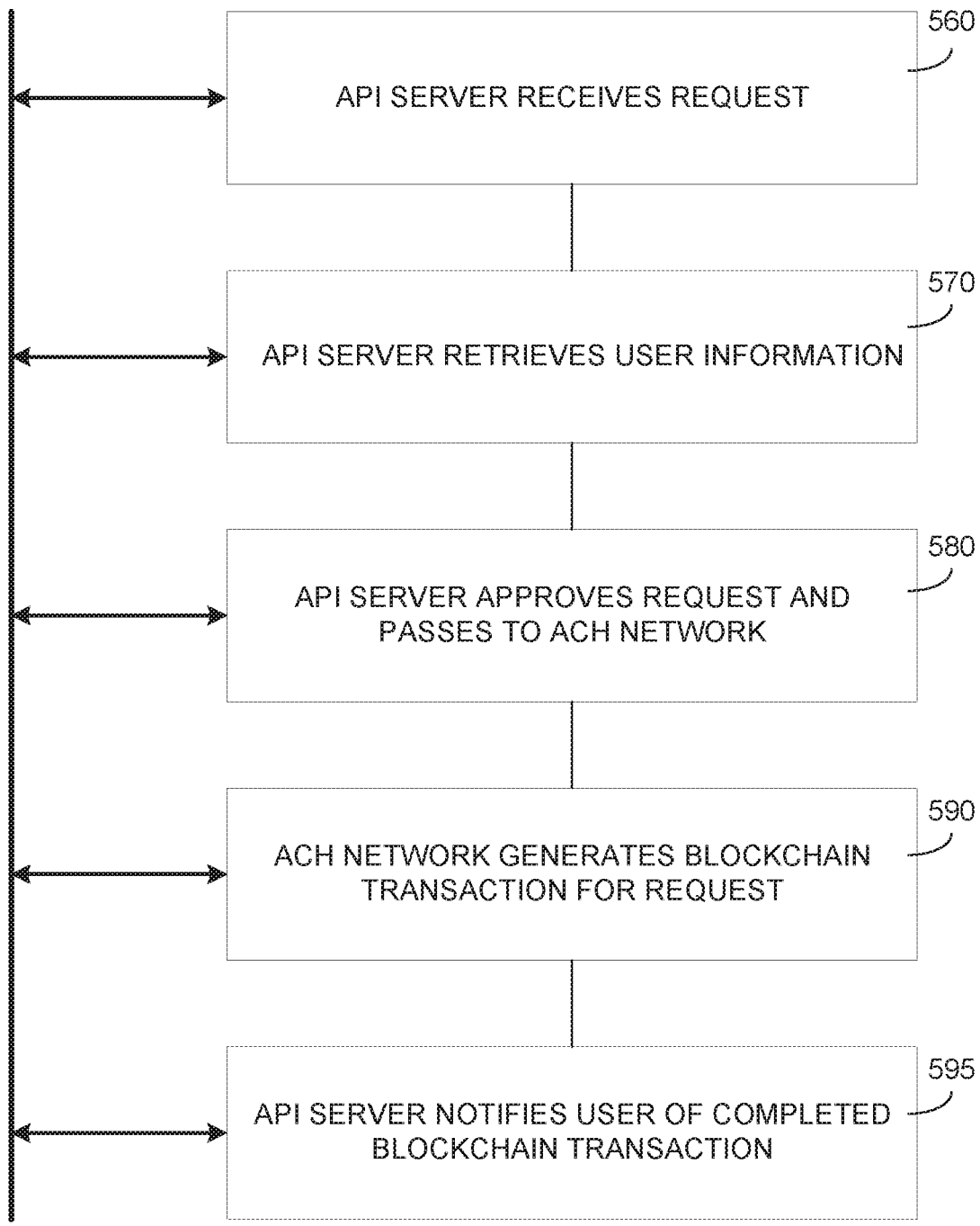
FIG. 5B illustrates a flow diagram of generating a blockchain transaction based on API requests, according to example embodiments.

FIG. 5B illustrates a flow diagram 550 of an example method of generating a blockchain transaction based on API requests, according to example embodiments. The method includes an API server receiving a request 560. In one embodiment, the request is a user request to withdraw funds from an account within a system to a bank account received by load balancer and application servers.

At block 570, the API server retrieves user information associated with the request. The information may be retrieved from a database and a data vault, and includes information required to access bank account data.

At block 580, the API server approves the request and passes the request to an ACH (automated clearing house) network. The passed-on request includes the necessary bank account information along with an amount to be withdrawn.

At block 590, the ACH network generates a blockchain transaction for the request. An originating node of the blockchain network provides transaction information and an updated user account balance to all other blockchain nodes of the blockchain network. A state transition corresponding to the transaction is recognized by the API server.

Finally, at block 595, the API server notifies a user of the completed blockchain transaction. The notification includes the updated account balance.

Figure 6A:
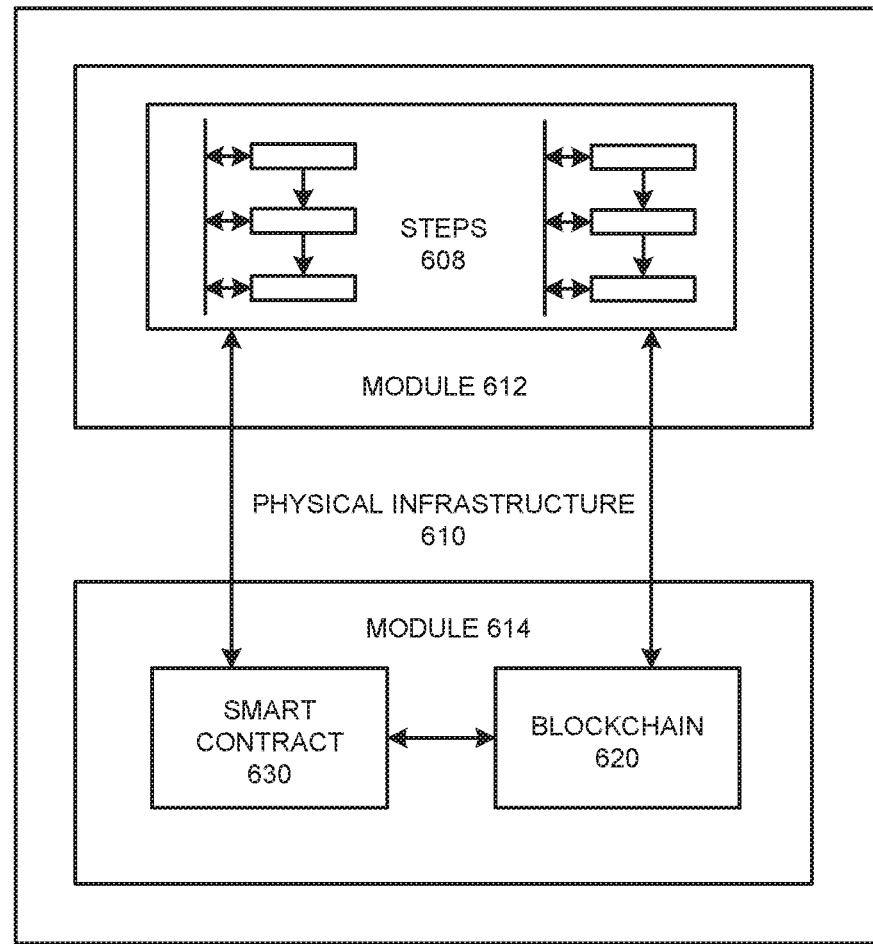
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
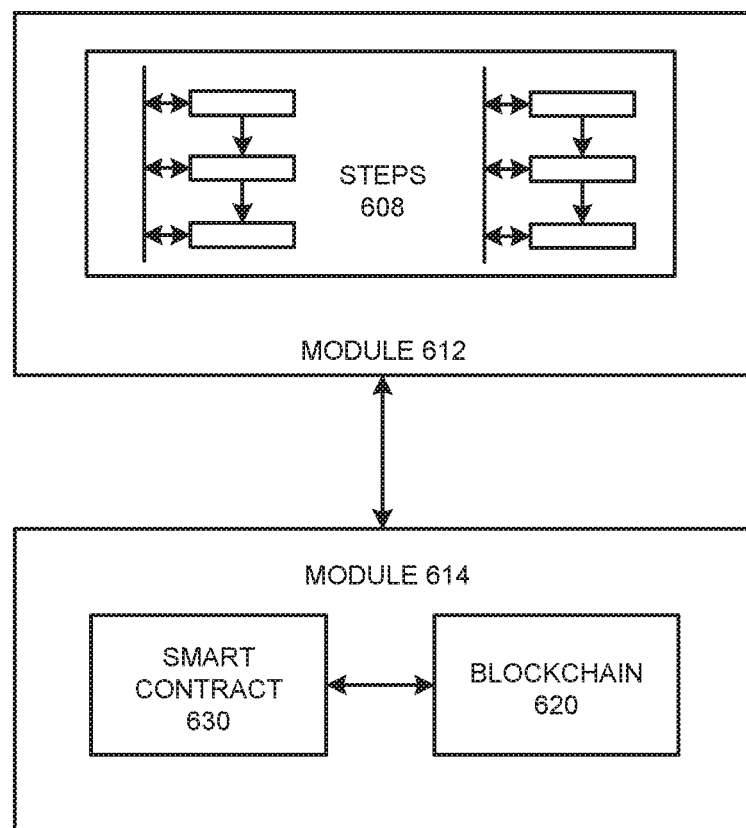
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
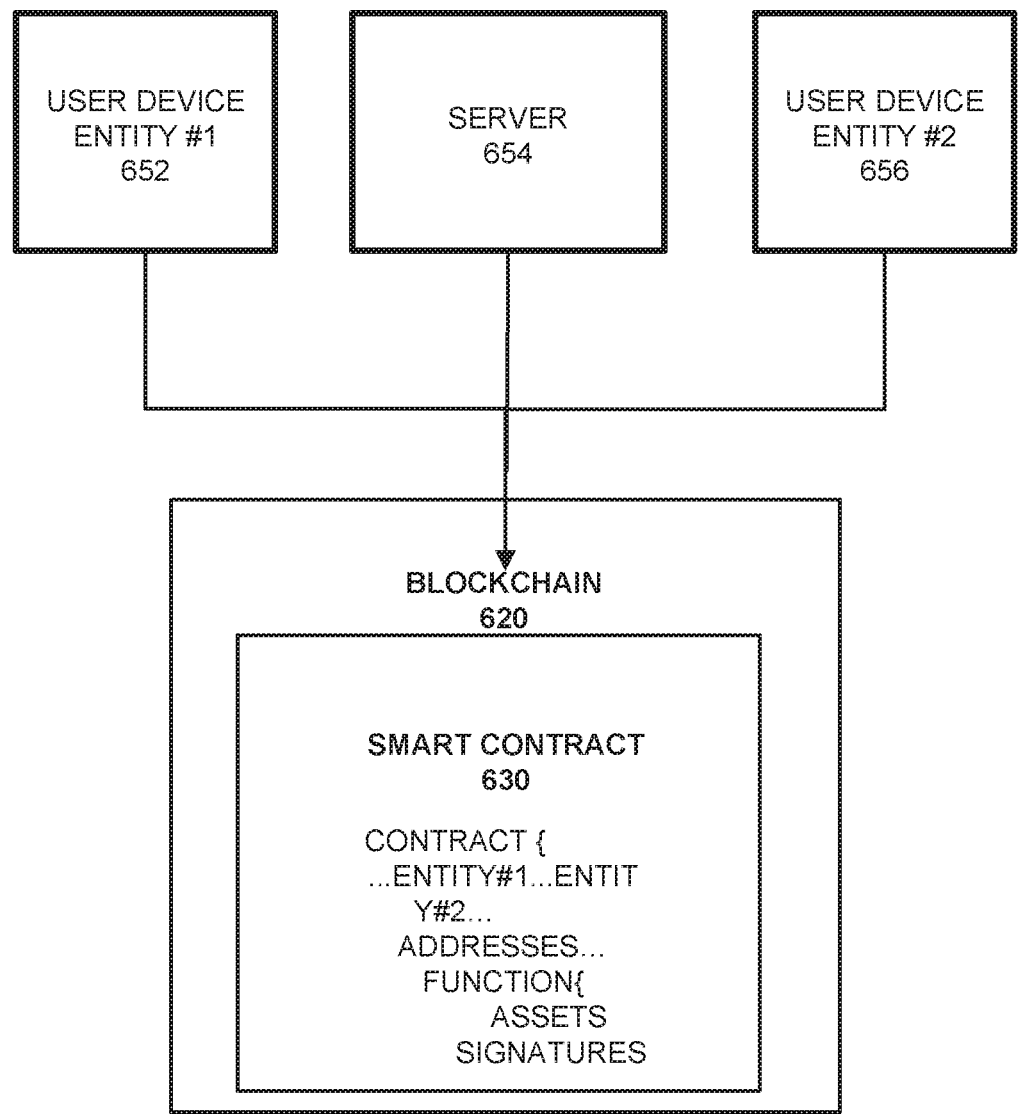
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
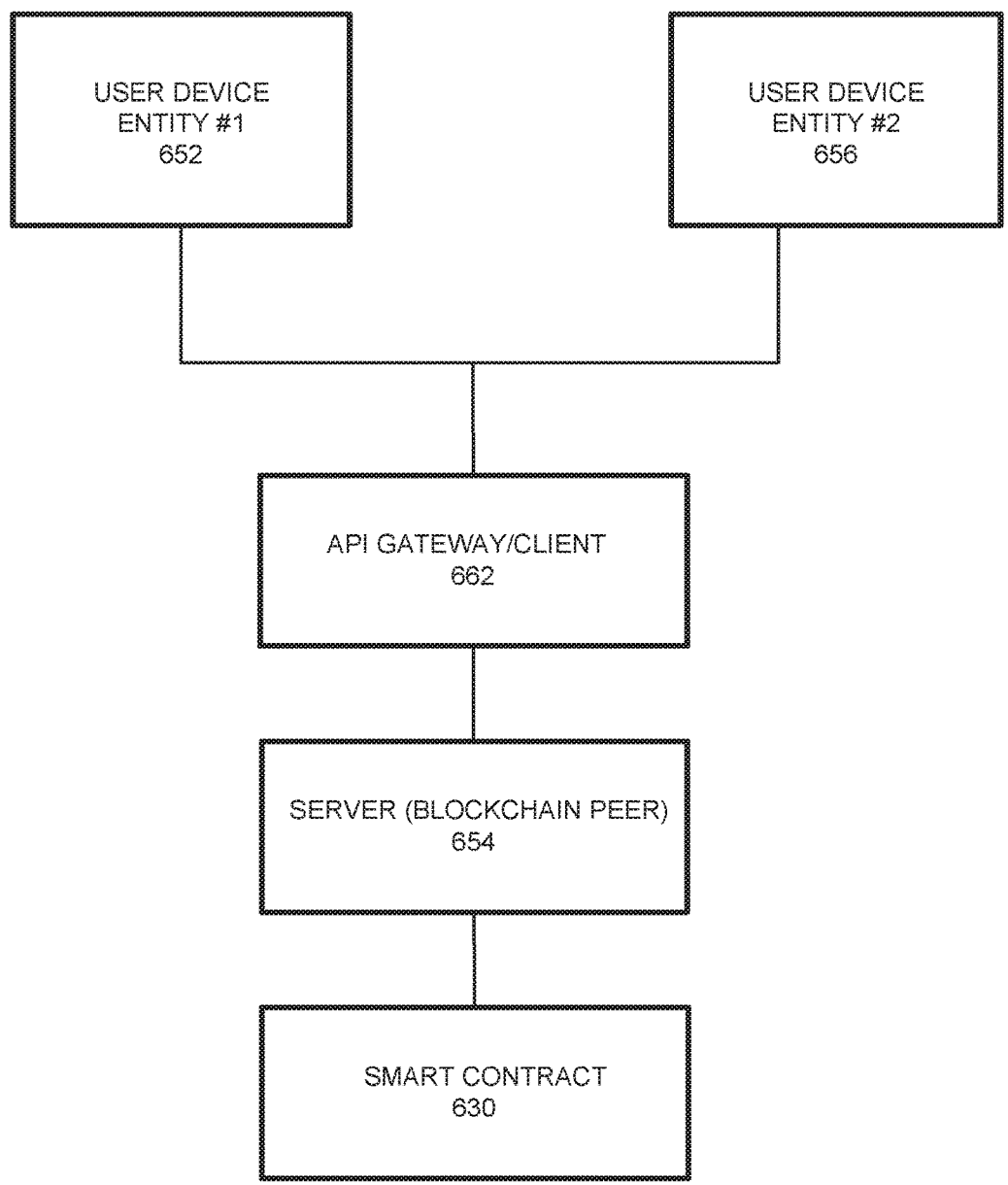
FIG. 6D illustrates an additional example system, according to example embodiments.

FIG. 6D illustrates a common interface 660 for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7A illustrates an example computer system architecture 700, which may represent or be integrated in any of the above-described components, etc.

Figure 7A:
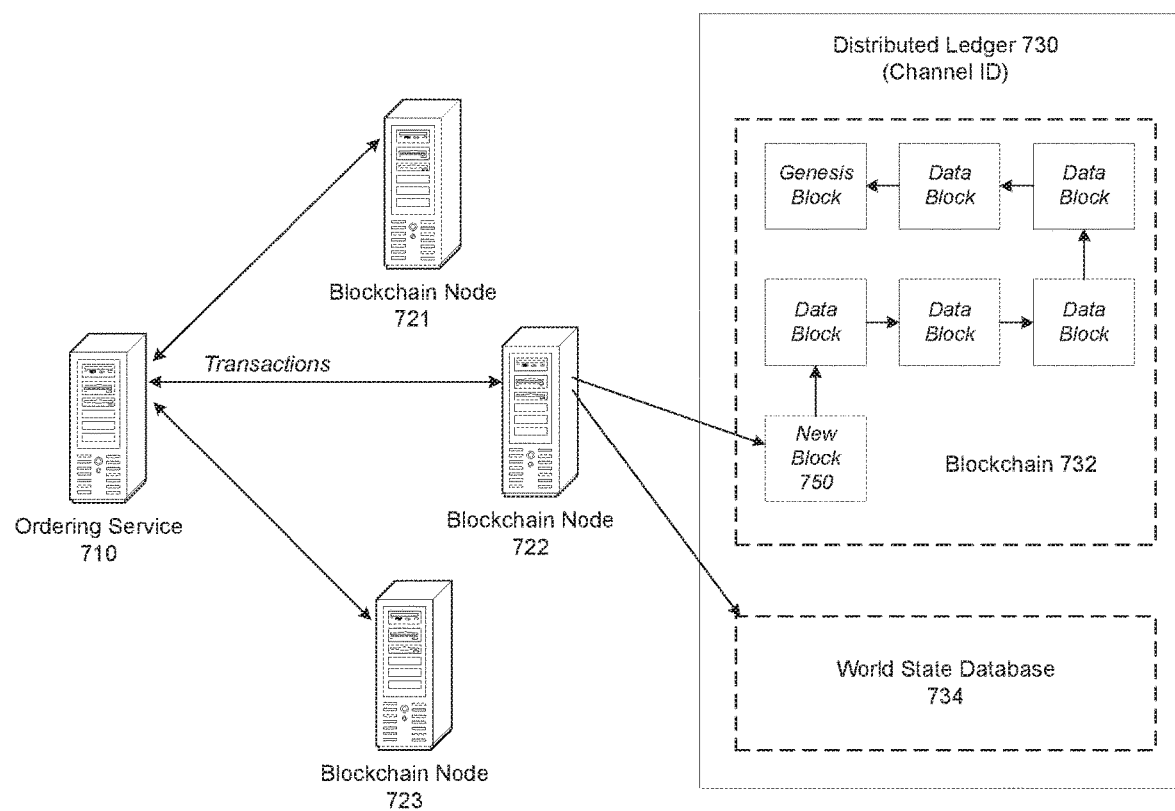
FIG. 7A illustrates a process of new data being added to a database, according to example embodiments.
Figure 7B:
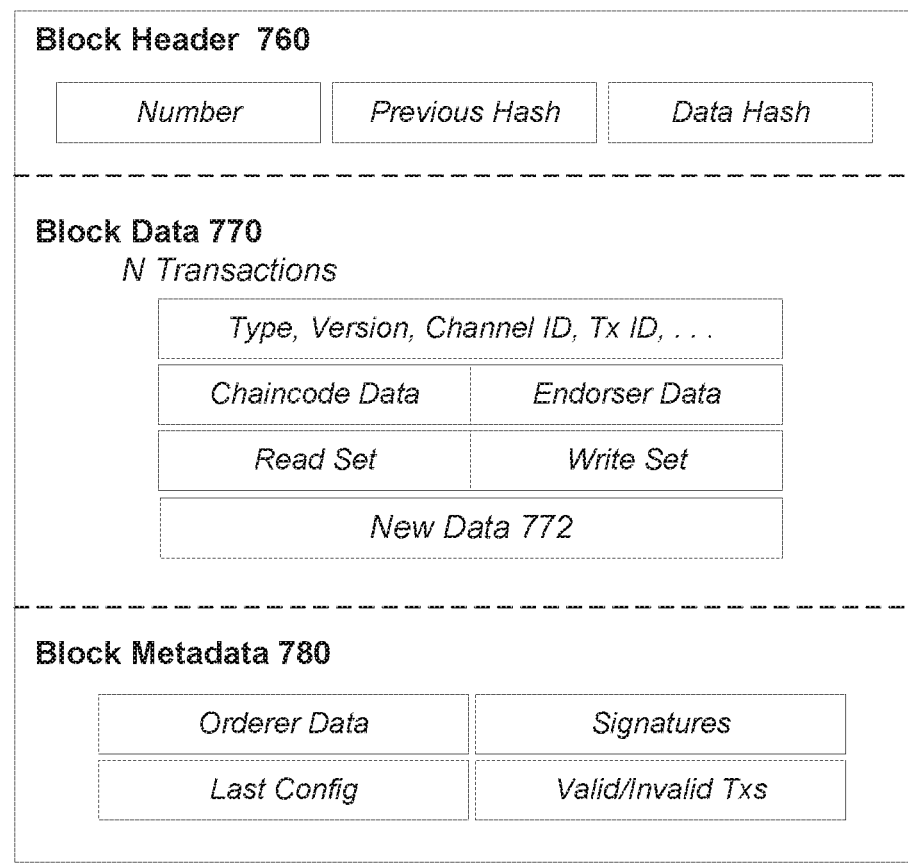
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents shown in FIG. 7B are merely for purposes of example and are not meant to limit the scope of the example embodiments. In some cases, both the block header 760 and the block metadata 780 may be smaller than the block data 770 which stores transaction data; however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, a related to served API requests 140 or completed API calls 136, and the like. The transaction data may be stored for each of the N transactions.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
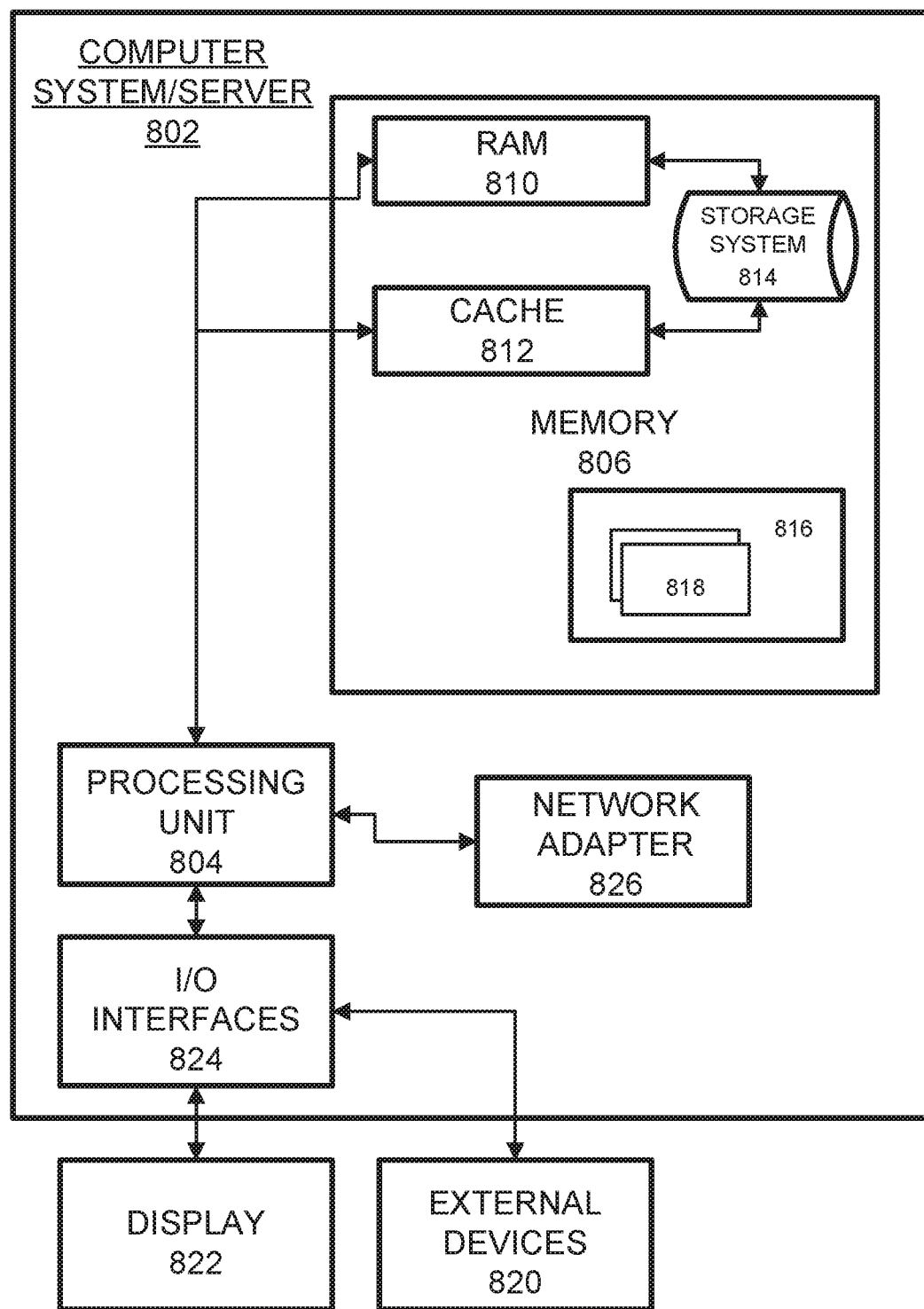
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A callee node in a blockchain network, the callee node comprising:
   a memory storing one or more instructions; and
   a processor that when executing the one or more instructions is configured to:
      receive an application program interface (API) call from a caller node of the blockchain network, the API call associated with a distributed transaction generated by a second smart contract executed by a processor of the caller node;
      attempt to perform the API call by a first smart contract of the callee node;
      generate an API result indicating a success or a failure of the attempt to perform the API call;
      send the API result to the caller node to review the API result and to cause the caller node to generate a notification indicating a success or a failure of the distributed transaction;
      in response to a receipt of the notification indicating the success of the distributed transaction, commit the distributed transaction to a shared ledger of the blockchain network.

2. The callee node of claim 1, wherein, when the API result indicates a successful performance of the API call, the processor is further configured to:
   update an API call completion status in the shared ledger.

3. The callee node of claim 1, wherein the processor is further configured to:
   submit a transaction comprising the API result to the shared ledger.

4. The callee node of claim 1, wherein, when the API result indicates a failed performance of the API call, the processor is further configured to:
   execute a rollback of the failed API call; and
   update the shared ledger with the failed API result.

5. The callee node of claim 1, wherein, when the API result indicates a successful completion of the API call, the processor is further configured to:
   perform a self-prepare operation; and
   update the shared ledger with the successful API result.

6. The callee node of claim 1, wherein, in response to the receipt of the notification indicating a failure of the distributed transaction, the processor is further configured to:
   execute a rollback of the failed API result.

7. The callee node of claim 6, wherein the rollback of the failed API call is not part of the API call.

8. The callee node of claim 6, wherein the API call and the API result are completely resolved within the blockchain network.

9. A method, comprising:
   receiving, by a callee node of a blockchain network, an application programming interface (API) call from a caller node of the blockchain network, the API call associated with a distributed transaction generated by a second smart contract executed by a processor of the caller node;
   attempting, by the callee node, to perform the API call by a first smart contract of the callee node;
   generating, by the callee node, an API result indicating the API call completing successfully or indicating a failure of the API call;
   sending, by the callee node, the API result to the caller node to review the API result and to cause the caller node to generate a notification indicating a success or a failure of the distributed transaction;
   in response to receiving the notification indicating the success of the distributed transaction, committing, by the callee node, the distributed transaction to a shared ledger of the blockchain network.

10. The method of claim 9, wherein, when the API result indicates the API call completing successfully, the method further comprises:
    updating, by the callee node, an API call completion status in the shared ledger.

11. The method of claim 9, wherein the method further comprises:
    submitting, by the callee node, a transaction comprising the API result to the shared ledger.

12. The method of claim 9, wherein, when the API result indicates the failure of the API call, the method further comprises:
    executing, by the callee node, a rollback of the failed API call; and
    updating, by the callee node, the shared ledger with the failed API result.

13. The method of claim 9, wherein, when the API result indicates the API call completing successfully, the method further comprises:
    performing a self-prepare operation; and
    updating the shared ledger with the successful API result.

14. The method of claim 9, wherein, in response to the receipt of the notification indicating a failure of the distributed transaction, the method further comprises:
    executing, by the callee node, a rollback of the failed API result.

15. A non-transitory computer readable medium comprising one or more instructions that when executed by a processor of a callee node in a blockchain network cause the processor to perform:
    receiving an application programming interface (API) call from a caller node of the blockchain network, the API call associated with a distributed transaction generated by a second smart contract executed by a processor of the caller node;
    attempting to perform the API call by a first smart contract of the callee node;

generating an API result indicating the API call completing successfully or indicating a failure of the API call;

sending the API result to the caller node to review the API result and to cause the caller node to generate a notification indicating a success or a failure of the distributed transaction;

in response to receiving the notification indicating the success of the distributed transaction, committing the distributed transaction to a shared ledger of the blockchain network.

16. The non-transitory computer readable medium of claim 15, wherein, when the API result indicates the API call completing successfully, the one or more instructions further cause the processor to perform:

updating an API call completion status in the shared ledger.

17. The non-transitory computer readable medium of claim 15, wherein the one or more instructions further cause the processor to perform:

submitting a transaction comprising the API result to the shared ledger.

18. The non-transitory computer readable medium of claim 15, wherein, when the API result indicates the failure of the API call, the one or more instructions further cause the processor to perform:

executing a rollback of the failed API call; and updating the shared ledger with the failed API result.

19. The non-transitory computer readable medium of claim 15, wherein, when the API result indicates the API call completing successfully, the one or more instructions further cause the processor to perform:

performing a self-prepare operation; and updating the shared ledger with the successful API result.

20. The non-transitory computer readable medium of claim 15, wherein, in response to a receipt of the notification indicating a failure of the distributed transaction, the one or more instructions further cause the processor to perform:

executing a rollback of the failed API result.

* * * * *